(12) United States Patent
Surendra Rao et al.

(10) Patent No.: US 10,346,237 B1
(45) Date of Patent: Jul. 9, 2019

(54) SYSTEM AND METHOD TO PREDICT RELIABILITY OF BACKUP SOFTWARE

(71) Applicant: EMC IP Holding Company LLC, Hopkinton, MA (US)

(72) Inventors: Naveen Kumar Surendra Rao, Bangalore (IN); Sanjeev Lohchab, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 216 days.

(21) Appl. No.: 14/838,940

(22) Filed: Aug. 28, 2015

(51) Int. Cl.
 *G06F 11/00* (2006.01)
 *G06F 11/07* (2006.01)

(52) U.S. Cl.
 CPC ........ *G06F 11/079* (2013.01); *G06F 11/0751* (2013.01); *G06F 11/0778* (2013.01)

(58) Field of Classification Search
 CPC ............... G06F 11/008; G06F 11/1464; G06F 11/0727; G06F 11/0781; G06F 11/1458; G06F 11/1466; G06F 11/1469; G06F 11/3409
 See application file for complete search history.

(56) References Cited

U.S. PATENT DOCUMENTS

| | | | | |
|---|---|---|---|---|
| 6,182,132 B1 * | 1/2001 | Bilakanti | .............. | H04L 12/403 370/254 |
| 6,862,696 B1 * | 3/2005 | Voas | ................... | G06F 11/3466 714/38.11 |
| 6,920,474 B2 * | 7/2005 | Walsh | .................. | G06Q 10/063 705/7.11 |
| 7,472,242 B1 * | 12/2008 | Deshmukh | .......... | G06F 11/1451 711/162 |
| 7,529,974 B2 * | 5/2009 | Thibaux | ................. | G06Q 10/04 714/26 |
| 7,747,987 B1 * | 6/2010 | Akarte | ................ | G06F 11/3612 702/179 |
| 7,765,444 B2 * | 7/2010 | Nikaido | ........... | G01R 31/31707 714/724 |
| 7,886,350 B2 * | 2/2011 | Ormazabal | ......... | H04L 43/0852 726/11 |
| 8,055,370 B1 * | 11/2011 | Achtnig | ........... | G05B 19/41875 340/3.1 |
| 8,161,193 B1 * | 4/2012 | Cain | ....................... | H04L 29/06 370/241 |
| 9,043,647 B2 * | 5/2015 | Sadaphal | .............. | G06F 11/079 714/26 |
| 2002/0162050 A1 * | 10/2002 | Milojicic | .............. | G06F 11/073 714/20 |
| 2003/0084376 A1 * | 5/2003 | Nash | ..................... | G06F 11/008 714/38.13 |

(Continued)

*Primary Examiner* — Loan L. T. Truong
(74) *Attorney, Agent, or Firm* — Staniford Tomita LLP

(57) ABSTRACT

Embodiments are directed to method of determining the reliability of a software program by correlating reliability with performance of the system through monitoring the entire system and it components. A component captures memory usage and CPU utilization of all components at regular interval and records failure of services by the system. An analyzer analyzes the events performed to determine which component failed to complete the action and record the failure against that component to enable identification of individual component reliability as well as the product as a whole.

18 Claims, 5 Drawing Sheets

(56) References Cited

U.S. PATENT DOCUMENTS

| | | | | |
|---|---|---|---|---|
| 2003/0088810 | A1* | 5/2003 | Marshall | G06F 11/3624 714/38.1 |
| 2004/0010735 | A1* | 1/2004 | Paternostro | G06F 11/3684 714/38.14 |
| 2004/0167731 | A1* | 8/2004 | Wang | H02J 3/00 702/60 |
| 2004/0220980 | A1* | 11/2004 | Forster | G06F 11/1451 |
| 2005/0138112 | A1* | 6/2005 | Sagar | H04L 67/14 709/203 |
| 2005/0223043 | A1* | 10/2005 | Randal | G06F 17/30315 |
| 2005/0262240 | A1* | 11/2005 | Drees | G06F 11/3476 709/224 |
| 2006/0271547 | A1* | 11/2006 | Chen | G06F 16/1844 |
| 2007/0033365 | A1* | 2/2007 | Vaidyanathan | G06F 11/3452 711/170 |
| 2007/0136200 | A1* | 6/2007 | Frank | G06Q 10/10 705/50 |
| 2007/0156274 | A1* | 7/2007 | Dierks | G05B 23/0251 700/108 |
| 2008/0082645 | A1* | 4/2008 | Rachitsky | G06F 17/3089 709/223 |
| 2008/0262794 | A1* | 10/2008 | Kitajima | G06F 21/577 702/181 |
| 2008/0288637 | A1* | 11/2008 | Nagaraja | G06F 17/30575 709/225 |
| 2009/0013207 | A1* | 1/2009 | Bose | G06F 11/008 714/1 |
| 2009/0300423 | A1* | 12/2009 | Ferris | G06F 11/36 714/38.1 |
| 2010/0036702 | A1* | 2/2010 | Sitton | G06Q 10/04 705/7.28 |
| 2010/0227607 | A1* | 9/2010 | Lorion | H04B 17/0085 455/425 |
| 2012/0221949 | A1* | 8/2012 | Olsa | G06F 11/3476 715/704 |
| 2012/0304010 | A1* | 11/2012 | Opstad | G06F 11/3688 714/34 |
| 2013/0198370 | A1* | 8/2013 | Aguchi | H04L 43/04 709/224 |
| 2013/0212576 | A1* | 8/2013 | Huang | G06F 9/45558 718/1 |
| 2014/0068329 | A1* | 3/2014 | Hopper | G06F 11/008 714/25 |
| 2014/0189128 | A1* | 7/2014 | Gu | H04L 67/1097 709/226 |
| 2014/0317060 | A1* | 10/2014 | Shen | G06F 11/1464 707/652 |
| 2014/0330845 | A1* | 11/2014 | Feldschuh | G06F 16/215 707/749 |
| 2015/0025872 | A1* | 1/2015 | Peterson | G06F 11/008 703/13 |
| 2015/0121145 | A1* | 4/2015 | Mahajan | G06F 11/079 714/37 |
| 2015/0293837 | A1* | 10/2015 | Rajamanickam | G06F 11/3676 717/130 |
| 2015/0294048 | A1* | 10/2015 | Jones | G06F 17/18 703/2 |
| 2015/0309918 | A1* | 10/2015 | Raghavan | G06F 11/3688 714/38.1 |
| 2016/0012246 | A1* | 1/2016 | Allen | G06F 21/6218 726/17 |
| 2016/0162394 | A1* | 6/2016 | dos Santos | G06F 11/3688 717/124 |
| 2016/0224430 | A1* | 8/2016 | Long | G06F 16/907 |
| 2016/0224447 | A1* | 8/2016 | Nakao | G06F 11/008 |

\* cited by examiner

| Type of failure | Crash of processes | Hang of process | Memory leak | Performance deviation or failure | Major Functional failure | Minor functional failure |
|---|---|---|---|---|---|---|
| Weighting | 1 | 1 | 0.5 | 0.2 | 1 | 0.3 |

SYSTEM AND METHOD TO PREDICT RELIABILITY OF BACKUP SOFTWARE

TECHNICAL FIELD

Embodiments are generally directed to computer backup software, and more specifically to determining the reliability of backup software.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. Advanced network storage systems, such as those that utilize virtualization technology has led to the increased use of virtual machines as data storage targets. Virtual machine (VM) disaster recovery systems using hypervisor platforms, such as vSphere from VMware or Hyper-V from Microsoft, among others, have been developed to provide recovery from multiple disaster scenarios including total site loss. The immense amount of data involved in large-scale (e.g., municipal, enterprise, etc.) level backup applications and the number of different potential problems that exist means that backup performance and reliable operation is a critical concern for system administrators.

Software reliability is usually defined as the probability of failure-free operation for a specified time in a specified environment for a specific purpose. There is a general requirement for more reliable systems in all application domains. To achieve the level of reliability the proper method and techniques are necessary in any product development life cycle. Present methods of testing software generally rely on comparing software performance against known performance metrics. This may provide a measure of how well the software performs on a certain machine, but does not give a picture of how reliable the software is with respect to deployment over a period of time. In order to measure software reliability, system administrators often mine service records, trouble logs, or user feedback to derive a profile of reliability for software products. This method only provides a retroactive view of product reliability and does not provide an indication of whether a particular product is unreliable or operating sub-optimally while it is in use.

What is needed, therefore, is a method of measuring the reliability of a system through techniques that continuously monitor system performance and failure patterns caused by any component in the system, and by providing proper analytical metrics which can determine the reliability of the individual components and of the whole system as well.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
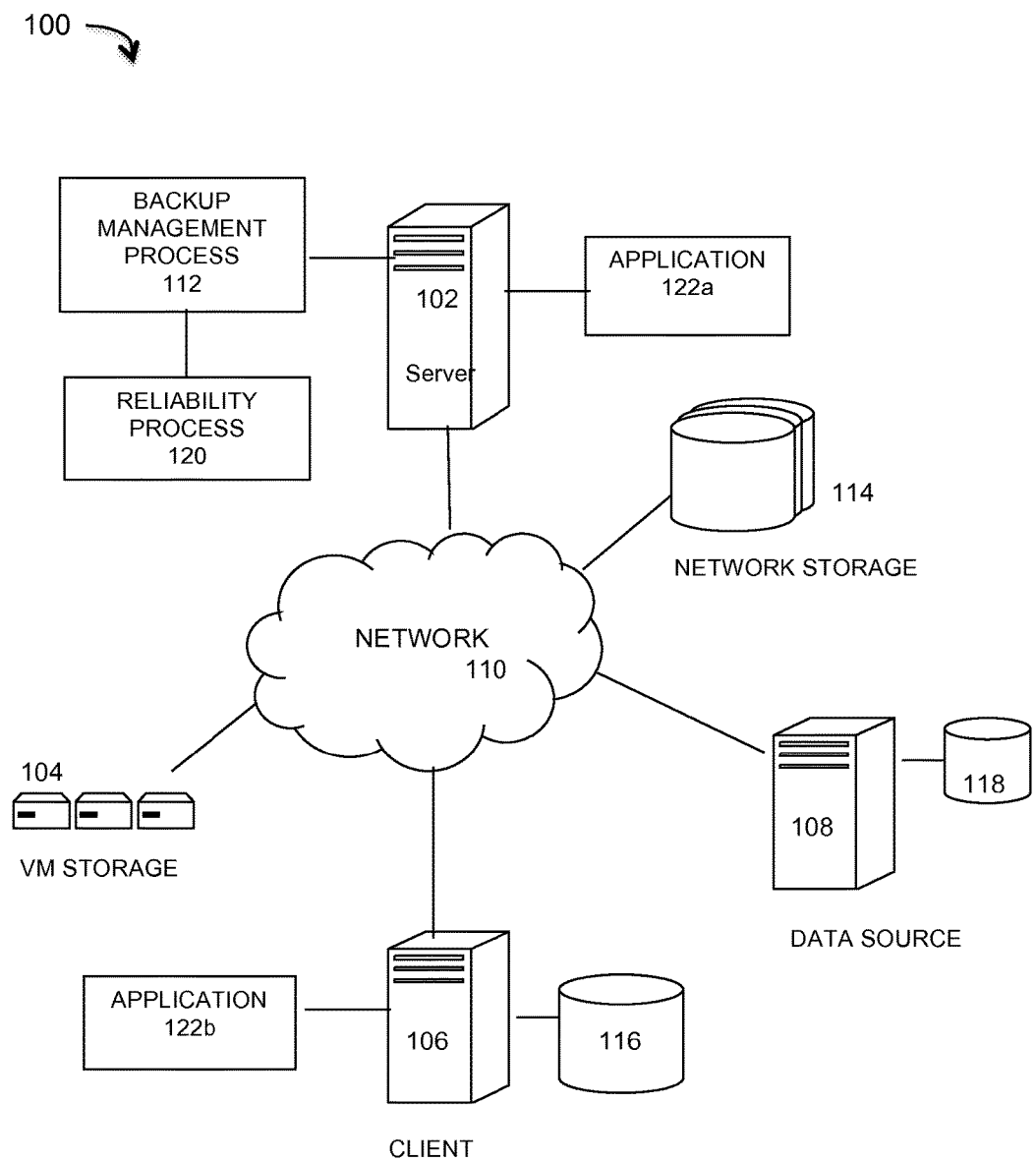
FIG. 1 is a diagram of a large-scale network implementing a VM grouping manager that provides resilient backups in CSV environments, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a reliability prediction process for network-level backup operations and applications, under some embodiments. In system 100, a backup server 102 executes a backup management process 112 that coordinates or manages the backup of data from one or more data sources 108 to storage devices, such as network storage 114, client storage 116, and/or virtual storage devices 104. With regard to virtual storage 114, any number of virtual machines (VMs) or groups of VMs may be provided to serve as backup targets, and the target VMs may also be organized into one or more virtual centers representing a physical or virtual network of many virtual machines. The network storage devices serve as target storage devices for data backed up from one or more data sources, such as computer 108, which may have attached local storage 118 or utilize networked accessed storage devices 114.

The data sourced by the data source may be any appropriate data, such as database data that is part of a database management system. In this case, the data may reside on one or more hard drives (e.g., 118) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. One or more backup appliances may maintain or backup databases within system 100.

A network server computer 102 is coupled directly or indirectly to the various client 106, data source 108, storage devices 114 and VMs 104 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In an embodiment, a one or more dedicated clients 106 or client storage machines may be provided with access to local storage media 116 or an interface to the network storage 114.

One or more of the computers of system 100 may execute application programs that source, receive, or otherwise process the data within the system. Applications may either be server-side applications 122a or client side applications 122b. For the embodiment of FIG. 1, network system 100 includes a server 102 that executes a data backup process with a functional component 120 that performs predictions of the software reliability of the backup process 112 and/or one or more of the application programs 122a or 122b executed within system 100.

In general, the reliability of a system is a measure of how well users think it provides the services that they require. Service here refers to the operation of application programs, software processes, I/O operations, memory accesses, and other similar metrics. The reliability process 120 helps develop reliable software service by correlating reliability with performance of the system. This process monitors the entire system 100 and it components, such as the computers, processing devices, storage devices, and applications.

Figure 2:
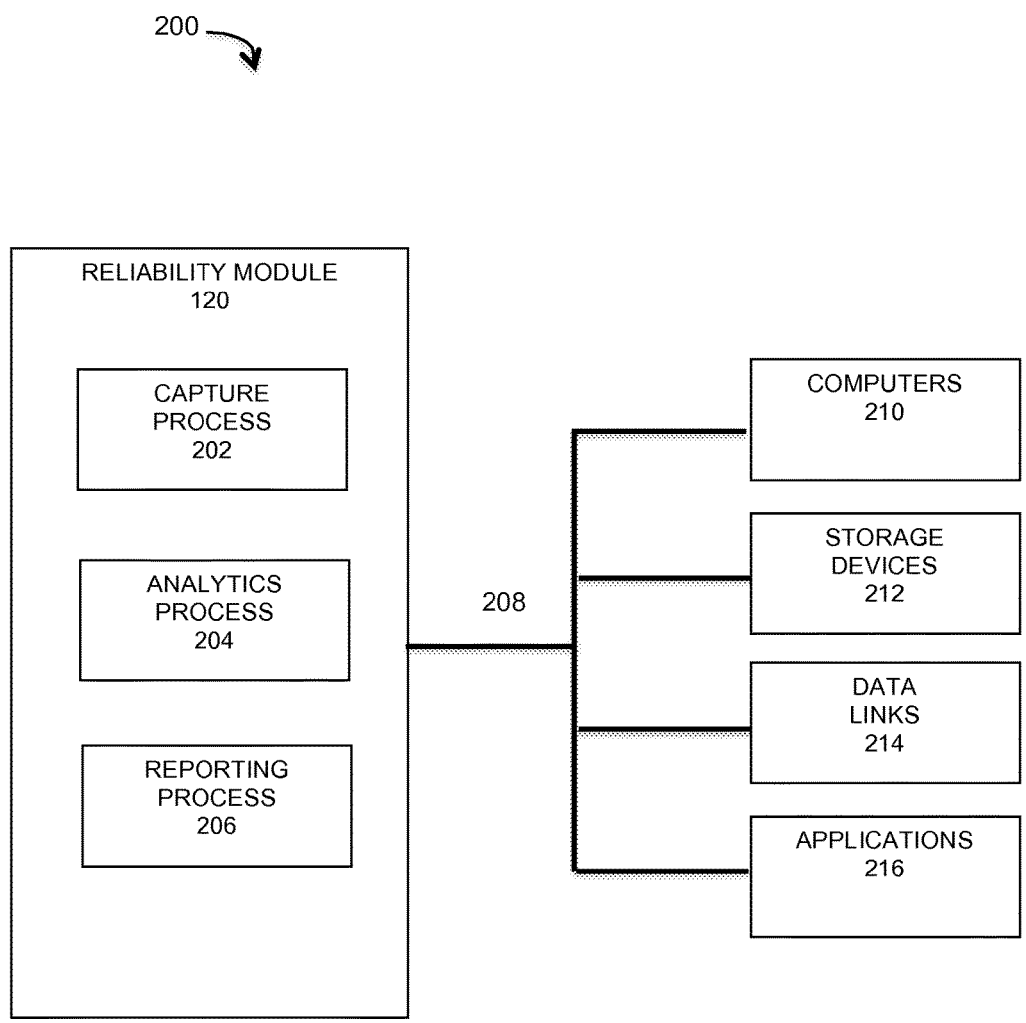
FIG. 2 illustrates functional components of a reliability process or module, under some embodiments.

FIG. 2 illustrates functional components of a reliability process or module, under some embodiments. As shown in diagram 200, the reliability module 120 includes several processes or functional sub-components such as capture process 202, analytics process 204, and a metrics reporting process 206, among other possible processes. The reliability module 120 is functionally coupled through network connections 208 to the resources of the system including other computers or processing devices 210, storage devices 212, data links or interfaces 214, applications 216, and other possible resources.

The reliability module 120 is configured, through capture process 202, to capture the memory, CPU utilization, and certain I/O activities of all system components at regular time intervals and record failure of services by the system.

In addition to this capturing operation, process 120 is also configured to analyze the events performed by and within the system. For example if backup of a file system is performed and if backups were failed due to storage node error, it will not record this event as a reliability failure of a product as whole, but rather a failure analytics module will analyze the failure and will determine which component failed to complete the action and record failure against it. Through reporting process 206 of the reliability module 120, a system administrator can identify the reliability of individual components and the product as a whole. This also allows the administrator to relatively easily identify the bottlenecks of the individual components of an overall system or hardware or software product, which will help in delivering reliable software to the customers. The reliability process 120 determines the system reliability using failures and faults captured in the system using analytics process 204. This captured reliability index can be compared across the release of the product or even within release cycles to identify and fix the design issues as early as possible.

Figure 3:
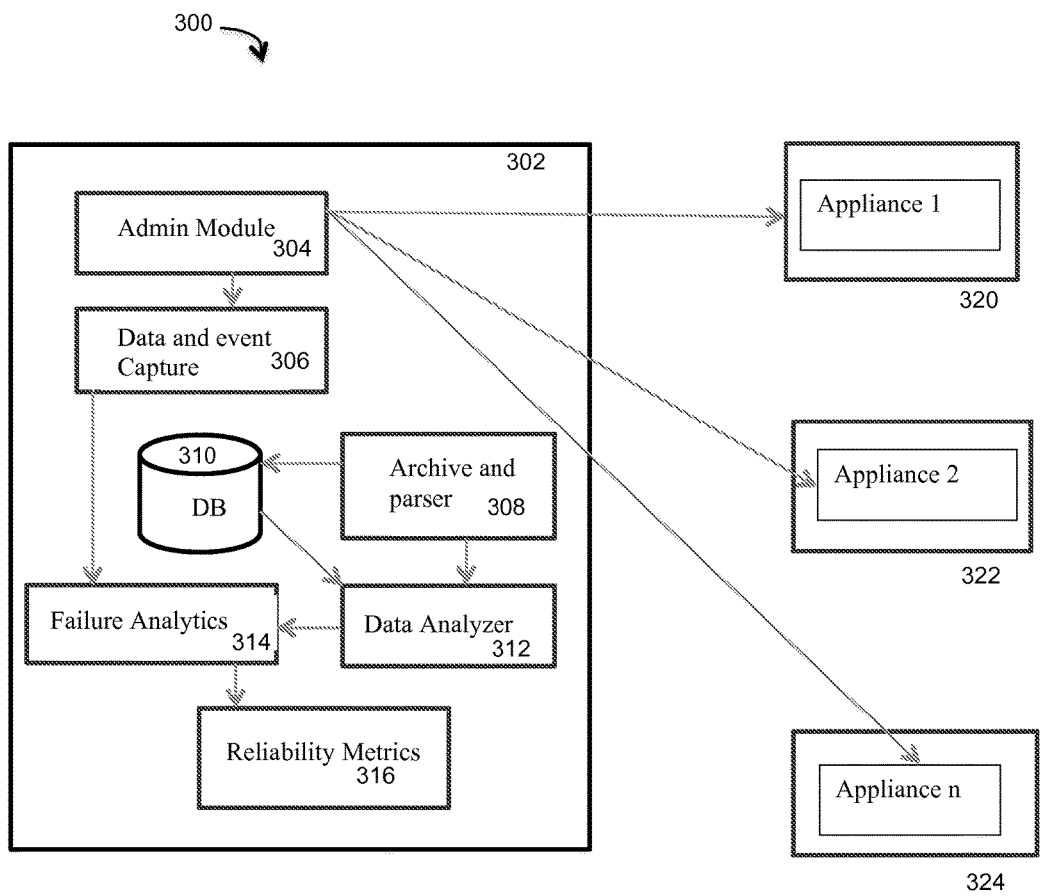
FIG. 3 illustrates operation of a reliability module in monitoring and analyzing system performance, under some embodiments.

FIG. 3 illustrates operation of a reliability module in monitoring and analyzing system performance, under some embodiments. As shown in diagram 300, the reliability module 302 comprises several functional components including an administrator (admin) module 303 a data and event capture module 306, an archive and parser module 308, a database 310, a data analyzer 312, a failure analytics component 314, and a reliability metrics component 316, as well as other possible components. The admin module is coupled through network connections to several different network resources 320, 322, and 324. These could be applications, processes, computers, and any other network resource, such as those illustrated in FIG. 2.

In the context of a network backup system, the resources may be data backup processes or components referred to as "appliances," and hence the resources pictured in FIG. 3 are denoted as "Appliance 1" to Appliance n." Thus, in an embodiment, systems 100 and 300 may represent a Data Domain Restorer (DDR)-based deduplication storage system, and storage server 102 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common interact file system) namespaces, as well as DD Boost provided by EMC Corporation. In general, DD Boost (Data Domain Boost) is a system that distributes parts of the deduplication process to the backup server or application clients 106, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

Figure 4:
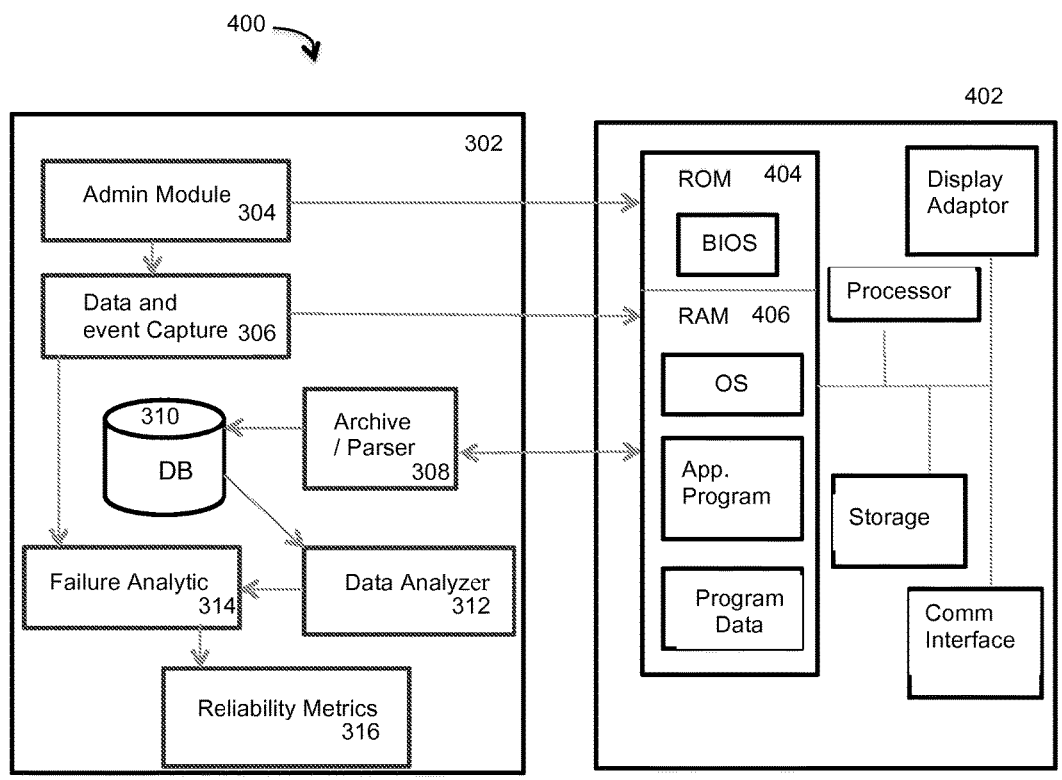
FIG. 4 illustrates operation of the reliability module in conjunction with backup server components, under some embodiments.

In an embodiment, the reliability module or process 120 is part of or functionally coupled to a backup management process 112, such in a backup server 102, such as the DDR server described above. The reliability process 120 may be configured to monitor and analyze overall network performance through processes and components of the backup server 102 itself. FIG. 4 illustrates operation of the reliability module in conjunction with backup server components, under some embodiments. As shown in diagram 400, the reliability module 302 is functionally coupled to certain components of the backup server 402. These components generally comprise the standard processing components and processes of a server computer, such as a processor, display adapter, memory storage, communication interface, and other components that are connected to on-board memory through a bus. The memory can be divided into ROM (read-only memory) 404, which stores persistent programs, such as the system BIOS (basic input/output system). The memory also comprises random access memory (RAM) space 406 which holds elements such as the operating system (OS), application programs, program data, and other processes. The memory of backup up server 402 is accessed through one or more direct or indirect connections by certain processes of the reliability module 302, such as the administrator module, the data and event capture module, and the archiver/parser. The element 402 in diagram 400 may represent the backup server 102 or any other network computer or host, such as any of the appliances 1 to n in FIG. 3. The reliability module 302 may be coupled to any practical number of network hosts, clients, or other appropriate network resource through the network 110.

In an embodiment, the reliability module monitors network resources (e.g., backup appliances) through continuously running daemon processes and analyzes system performance, such as memory and CPU utilization to determine if there are potential reliability or performance issues in the system or in specific components of the system. For example, a daemon process may capture all memory access and if memory utilization grows by an inordinate amount compared to expected levels, this may be flagged as a problem and trigger a failure detection routine, and similarly for processor usage. Recording performance metric data for a number of different monitoring daemons can be used to compile a performance and reliability profile of the entire system. The system can be configured to monitor certain aspects of the system over defined periods of time, such as hourly, daily, weekly, monthly, and so on, or over user defined time periods. Performance metrics are captured at every interval and stored in memory for analysis by a data analyzer. In an embodiment, the system gathers data based on network utilization and/or network throughput by monitoring one or all of the following components for each host: CPU, memory (RAM), network I/O, and any other relevant operating parameter. Long term product reliability can be determined for software or hardware products by monitoring and compiling data for relatively long periods, such as on a yearly basis.

Figures 5, 6:
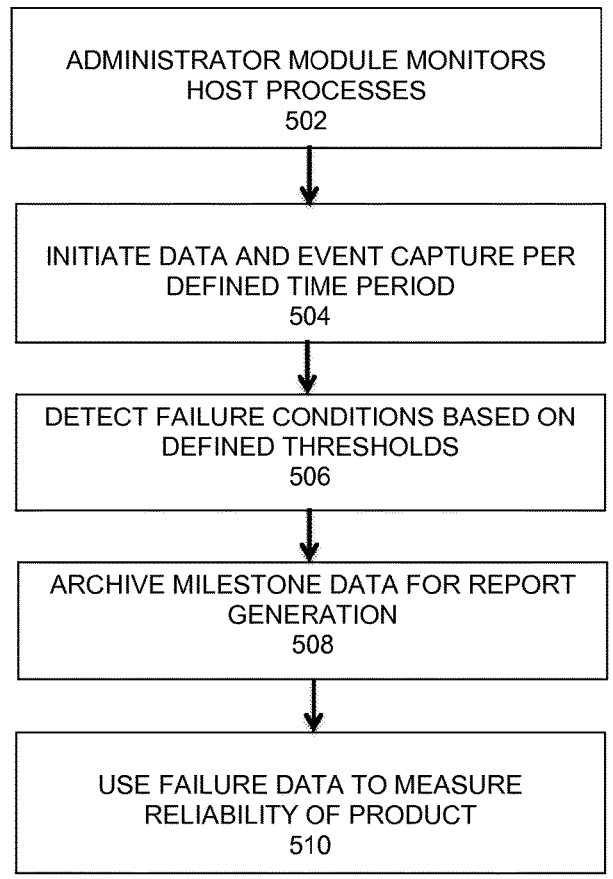
FIG. 5 is a flowchart that illustrates a method of reliability monitoring and analysis, under some embodiments.
FIG. 6 is a table that illustrates example values of a weighting factor for a particular type of product, under an embodiment.

FIG. 5 is a flowchart that illustrates a method of reliability monitoring and analysis, under some embodiments. With respect to the workflow of the reliability module components shown in FIG. 3, the administrator module 304 monitors any host 320 to 324 in a given time period, step 502. The user can add the processes or daemon to monitor the hosts at specific time intervals, which can be defined in the admin module by the user, or set by default to system values. For example a host running a backup appliance can be directed to be monitored by the admin module for a time of 21 days. The user can specify which process is to be monitored and data component 306 captures data on a periodic basis, such as every 60 minutes or any other appropriate time period. The admin module can manage more than one host (as shown in FIG. 3) and each host will have its own attributes to monitor independently of any other host. The admin module initiates the data and event capture module 306 to capture all relevant data to be captured for list of processes or daemons specified in admin module, step 504. This module will capture CPU utilization, memory utilization, I/O throughput of all the relevant or selected processes. In addition to capturing the performance details, module 306 also gets the all the logs of the appliance to determine an event failure, step 506. The monitored data is stored in a local database 310 and can optionally be offloaded to external storage, if necessary. A failure may be detected by comparison of performance to a known standard or defined threshold value. For example, if memory usage exceeds a defined threshold of 50%, this might be flagged as a detected failure condition. In an embodiment, the archiver and parser module 308 archives milestone data and parses them daily (or per some other defined reporting period) for report generation which will be available for users, step 508. The failure data can then be used to measure the overall reliability of the monitored process or processes over the monitoring period (e.g., 21 days) or multiples of the monitoring period. In this manner, data captured per a data capture period (e.g., hourly) is compiled for an entire monitoring period (e.g., monthly) to compile reliability metrics 316 of a backup appliance or other system resource.

In an embodiment, the reliability measuring system consists of two main analyzer modules, which are failure analytics module 314 and the data analyzer 312. The failure analytics module 314 analyzes the log to capture the failures and which will determine which process failed the expected operation. The data analyzer 312 evaluates the performance data and determines the performance failure in the system. This module captures the core and crashes of any process in the appliance, memory leaks of any processes in the system, and other system conditions. Along with this, the data analyzer 312 also benchmarks the system performance of any process against that of an earlier release. If the performance of any process yields results that are significantly different from earlier releases, this may also be flagged as a condition that contributes to failures in the appliance. For example, consider a backup appliance that has a process x which uses 20% CPU utilization for a given operation in a first release ("release 1") of the appliance. If the same process utilizes 80% of the CPU to complete same operation in release 1.1 under similar or same environmental conditions, this condition may be recorded as a failure by data analytics module.

In an embodiment, the reliability metrics module 316 uses all the different failure data to measure the reliability of the product. If the total number of failures in all appliance in a time period T is F, then the best estimate for the failure rate of the software is $\lambda=F/(T)$. Each failure will have different weighting based on a product type or characteristic. For some products a crash or hang of a process may be a very important failure compared to a functional failure like a user interface failure, or other minor functional failures. In the case of backup software, a case in which a backup operation fails may be considered to be the most important failure, as it represents a major functional failure.

In an embodiment, a weighting value is defined and associated with the type of failure, and this value is used to derive a reliability factor. FIG. 6 is a table that illustrates example values of a weighting factor for a particular type of product, under an embodiment. The example of FIG. 6 illustrates several types of failures including crash, hang, memory leak, performance deviation, major functional failure and minor functional failure along with associated weighting factors. Other types and weightings are also possible, and the values in FIG. 6 are intended to be for example only. The weighting factors are summed and multiplied by the number of failures versus the total measurement time to derive a reliability factor. In an embodiment, the reliability factor is calculated using the following formula:

Reliability factor=ΣWeighting to a failure*No of failure/Total Time in hour

Different weightings, types of failure, and other scaling factors may be used depending on the type of application, software product, or process is monitored and analyzed for reliability and failure conditions.

It should be noted that applications that are executed by one or more of the client or server computers may be backup applications or any other appropriate application program or suite of programs. Likewise, although embodiments have been described with respect to network backup comprising certain specific technologies, it should be noted that embodiments are not so limited, and that other backup systems and methods may also be used.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of measuring reliability of a deduplication backup program executed by a backup server in an enterprise-level network including a plurality of backup appliances including storage nodes, comprising:

monitoring, in a capture process executed in a processor of a reliability module in the backup server, a plurality of components in the backup appliances and the deduplication backup program for an overall monitoring period;

measuring, in a data analyzer process executed in the processor, a functional performance of each of the plurality of components based on a failure of a storage node due to a failure type of a plurality of failure types, wherein the functional performance is measured through continuous daemon processes on a periodic basis defined by a time period;

comparing the measured functional performance to defined performance values to identify a specific failed component of the storage node to distinguish from failure of the deduplication backup program as a whole; and deriving a reliability measure by summing a weighted value of a total number of failures of the plurality of failure types per the overall monitoring period through a formula that sums weighted failure types multiplied by the total number of failures per a total time period, and as expressed by:

Reliability factor=ΣWeighting to a failure*No of failure/Total Time in hour, to provide a measure of analytical metrics that can be used to analyze overall network performance to identify failure patterns caused by the plurality of components to thereby improve the reliability of the deduplication backup program.

2. The method of claim 1 further comprising assigning different weighting values to each failure type of the plurality of failure types, wherein the storage node is part of a backup appliance executing a client-side deduplication process distributed by the backup server.

3. The method of claim 2 wherein the functional performance comprises at least one of processor usage, memory usage, and network input/output throughput.

4. The method of claim 3 wherein the plurality of components is selected from the group consisting of: central processing units (CPUs), application programs, storage devices, and network links.

5. The method of claim 4 wherein the types of failures including a program crash, a program hang condition, a memory leak, a performance deviation in excess of a defined threshold, a major functional failure of a core feature of the deduplication backup program, and a minor functional failure of a non-core feature of the deduplication backup program.

6. The method of claim 1 wherein the time period is defined by one of a user or a default system setting.

7. The method of claim 6 wherein the overall monitoring period is on the order of multiple weeks, and wherein the time period is on the order of multiple minutes.

8. The method of claim 1 wherein the defined performance values comprise past performance values compiled or an earlier version of the deduplication backup program.

9. The method of claim 7 wherein the network comprises a multi-tenant network in which the backup server runs a single instance of a program serving multiple clients embodied as the backup appliances, and in which the deduplication backup program virtually partitions its data so that each client works with its own customized virtual application.

10. The method of claim 9 wherein the backup server and deduplication backup program comprise a Data Domain Restorer (DDR)-based deduplication storage system.

11. A system comprising a processor-based executable module configured to derive a reliability metric of a deduplication backup program executed by backup server in an enterprise-level network including a plurality of backup appliances including storage nodes, comprising:

a processor of the backup server having an administrator module executing first program instructions to monitor a plurality of components in the backup appliances and the deduplication backup program during a monitoring time period;

a capture module of the processor executing second program instructions in the processor to capture data and events of the components through continuous daemon processes running on a periodic basis defined a measurement period;

a failure analytics module of the processor executing third program instructions to analyze a log of the data and events to capture failure conditions to determine which process failed an expected operation causing failure of a storage node;

a data analyzer of the processor evaluating performance data of the software program to identify a specific failed component of the storage node to distinguish from failure of the deduplication backup program as a whole; and and reliability module executed by the processor and deriving a reliability measure using a weighted value formula, and deriving a reliability measure through a formula that sums weighted failure types multiplied by a number of failures per a total time period, and as expressed by:

Reliability factor=ΣWeighting to a failure*No of failure/Total Time in hour, to provide a measure of analytical metrics that can be used to analyze overall network performance to identify failure patterns caused by the plurality of components to thereby improve the reliability of the deduplication backup program.

12. The system of claim 11 wherein the data and events comprise CPU utilization, memory utilization, I/O throughput for each component, and wherein the storage node is part of a backup appliance executing a client-side deduplication process distributed by the backup server.

13. The system of claim 12 wherein the failure analytics module captures conditions selected from the group consisting of: program crashes, program hang conditions, memory leaks, performance deviations in excess of a defined threshold, major functional failures of a core feature of the deduplication backup program, and minor functional failures of a non-core feature of the deduplication backup program.

14. The system of claim 13 wherein the data analyzer benchmarks the deduplication backup program performance against a defined standard, comprising one of an earlier release and a comparative backup program.

15. The system of claim 14 wherein the monitoring time period is on the order of multiple weeks, and wherein the measurement period is on the order of multiple minutes.

16. The system of claim 11 wherein the network comprises a multi-tenant network in which the backup server runs a single instance of a program serving multiple clients embodied as the backup appliances, and in which the deduplication backup program virtually partitions its data so that each client works with its own customized virtual application.

17. The system of claim 16 wherein the measurement period is defined by one of a user or a default system setting.

18. A computer program product, comprising a non-transitory computer-readable medium having a computer-readable program code embodied therein, the computer-readable program code adapted to be executed by one or more processors to implement a method for measuring reliability of a deduplication backup program executed by a backup server in an enterprise-level network including a plurality of backup appliances including storage nodes by:

monitoring, in a capture process executed in a processor of a reliability module in the backup server, a plurality of components in the backup appliances and the deduplication backup program for an overall monitoring period;

measuring, in a data analyzer process executed in the processor, a functional performance of each of the plurality of components based on a failure of a storage node due to a failure type of a plurality of failure types, wherein the functional performance is measured through continuous daemon processes on a periodic basis defined by a time period;

comparing the measured functional performance to defined performance values to identify a specific failed component of the storage node to distinguish from failure of the deduplication backup program as a whole; and deriving a reliability measure by summing a weighted value of a total number of failures of the plurality of failure types per the overall monitoring period through a formula that sums weighted failure types multiplied by the total number of failures per a total time period, and as expressed by:

Reliability factor=$\Sigma$Weighting to a failure*No of failure/Total Time in hour, to provide a measure of analytical metrics that can be used to analyze overall network performance to identify failure patterns caused by the plurality of components to thereby improve the reliability of the deduplication backup program.

* * * * *